No. 821,902. PATENTED MAY 29, 1906.
H. B. TODD.
STATIC INDUCTION GENERATOR.
APPLICATION FILED FEB. 18, 1905.
FIG. 1
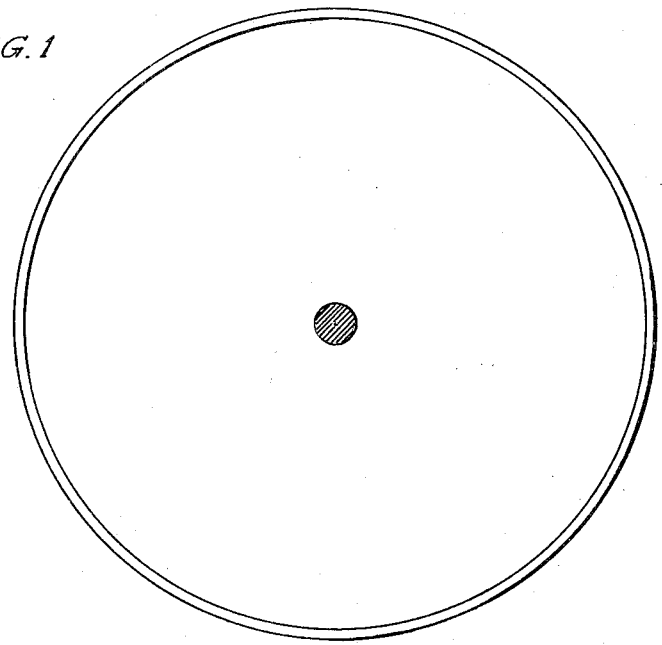
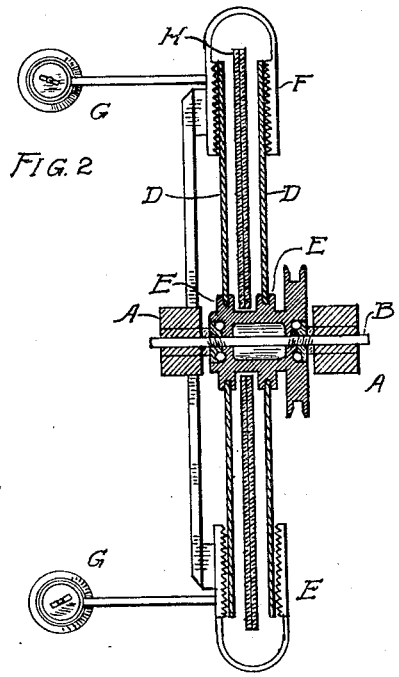
FIG. 2
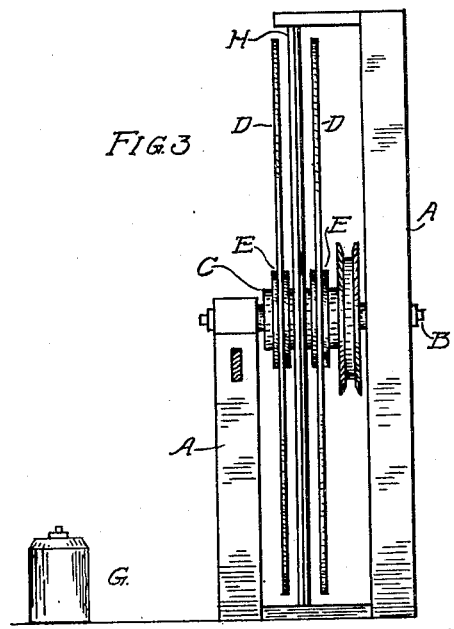
FIG. 3
WITNESSES
A. W. Todd
D. B. Todd
INVENTOR
Henry B. Todd.

UNITED STATES PATENT OFFICE.

HENRY B. TODD, OF MERIDEN, CONNECTICUT.

STATIC-INDUCTION GENERATOR.

No. 821,902.      Specification of Letters Patent.      Patented May 29, 1906.

Application filed February 18, 1905. Serial No. 246,242.

*To all whom it may concern:*

Be it known that I, HENRY B. TODD, a citizen of the United States, residing at Meriden, in the county of New Haven and State of Connecticut, have invented certain new and useful Improvements in Static-Induction Generators, of which the following is a specification, reference being had therein to the accompanying drawings.
This invention relates to electrical machines, and is more especially intended to apply to static-induction generators of electricity.

The object of the invention is to produce a machine in which the moving induction or generating device shall be a very efficient non-conductor not subject to the collection or condensation of moisture, as in glass, and of much greater strength than glass or hard rubber, and which can be revolved at a very great speed without danger of breakage, and that is comparatively cheap; also to produce a very efficient and cheap insulating material for use in other parts of the machine where insulation is necessary or convenient.

Figure 1 is an illustration of my improved disk. Fig. 2 is a horizontal section showing the general arrangement of the essential parts of the static machine; and Fig. 3 is a side elevation, partly in section, of such a static machine.

Referring to Figs. 2 and 3, A A represent standards which support shaft B, on which a hollow hub C is supported by ball-bearings.
On this hub two disks D D are firmly held between clamp-plates E. The hub and disks can be rotated at a high speed by any suitable mechanism. Combs F are arranged on any suitable supports and connected by proper metallic connection to jars G. The plates H between the disks are supported from the frame in fixed position in any usual way.

The machine so far described may be varied in many particulars. It is merely an example of a convenient form of static machine, and the construction and arrangement of parts may be varied in many ways. In machines of this character glass is generally the material of the disks D. This is objectionable in a machine which must be driven at a high speed to secure high vibratory or oscillatory currents. Hard-rubber disks have also been used, but with unsatisfactory results where very high voltage is desired.

The plates and other insulators in my machine are constructed in the following manner: I form any non-conducting or partially-non-conducting fibrous material into the shape and size required for any particular 60 part of the machine and then immerse in a bath of melted sulfur until the plates or other parts are thoroughly saturated. Then they are taken from the bath, placed in a mold of proper shape, and pressed until cooled in order to make them smooth, true, and compact. These materials can also be combined in other ways. For instance, the fibrous material can be used in the form of pulp and mixed in the liquefied non-conducting material until thoroughly saturated, then pressed while in a liquid or semiliquid state into a mold to form a plate or insulator of any shape or form desired, equal to or superior to glass, porcelain, hard rubber, or mica and at considerably less cost.

The plates already made in the manner described do not deteriorate with age and have proved far stronger than glass or hard rubber and may be driven at a speed which would break the latter from the centrifugal action.

My improved plate generates a larger quantity of electricity at same speed than glass, with which it has been compared in same machine.

The advantages of my improved plate over glass, hard rubber, or mica are greatly-increased generating power; no loss or annoyance from breakage of plates in manufacturing or transportation, as is common with glass; a much higher rate of speed, which will double the power of any glass-plate machine now in use, and can be made at a considerably less cost.

As the plates in the machines now in common use, some of which use twenty-four or more in a single machine, are very expensive, the use of my improved plate will enable such machines to be built and furnished the medical profession at a much lower price, thus enabling a large number of physicians now barred on account of the excessive cost to purchase and use static X-ray machines to the great benefit of their patients.

As the quantity or amperage of the electric force produced depends largely on the speed of movement of the revolving plates, I am able to produce a much larger volume with the same number of plates than any other machine now in use.

The plate so constructed seems to be proof against the condensation of moisture in the atmosphere, and I am able to use such machines under climatic conditions where a machine with ordinary plates could not be used at all. I am also able to make plates of much larger diameter than can be used of glass with any degree of safety.

What I claim is—

1. A generating plate or cylinder for static machines composed of fibrous material and sulfur substantially as described.

2. A generating plate or cylinder for static-induction generators composed of a body of fibrous material saturated with sulfur by immersion in a melted bath substantially as described.

3. In a static-induction generator the combination with the usual driving, supporting and collecting mechanism of a plate or disk formed of fibrous material and sulfur substantially as described.

4. In a static-induction generator in combination with the usual driving and collecting mechanism; the plates, comb-supports, and other parts and appliances that are usually made of hard rubber or glass formed of a fibrous material saturated with sulfur substantially as described.

In testimony whereof I affix my signature in presence of two witnesses.

HENRY B. TODD.

Witnesses:
A. W. TODD,
D. B. TODD.